Dec. 14, 1965 J. A. CRAWFORD ETAL 3,223,777

SCANNER SYSTEM

Filed Nov. 26, 1962 3 Sheets-Sheet 1

INVENTORS.
JACK A. CRAWFORD
WILLIAM H. WOODWORTH
*BY*

R. H. Fisher

ATTORNEY.

INVENTORS.
JACK A. CRAWFORD
WILLIAM H. WOODWORTH
BY
P. H. Firsht
ATTORNEY.

INVENTORS.
JACK A. CRAWFORD
WILLIAM H. WOODWORTH
*BY*
P. H. Firsht
ATTORNEY.

United States Patent Office 3,223,777

Patented Dec. 14, 1965

3,223,777

SCANNER SYSTEM

Jack A. Crawford and William H. Woodworth, China Lake, Calif., assignors to the United States of America as represented by the Secretary of the Navy Filed Nov. 26, 1962, Ser. No. 240,183
8 Claims. (Cl. 178—5.4)
(Granted under Title 35, U.S. Code (1952), sec. 266)

The invention herein described may be manufactured and used by or for the Government of the United States of America for governmental purposes without the payment of any royalties thereon or therefor.

This invention relates to a television camera system and more particularly to a television camera system for obtaining pictures of the surface of the earth from space, i.e., from distances ranging from 200 to 1,000 miles from the earth's surface, for various purposes which include weather observation and mapping operations.

In the field of television there are a number of known techniques and devices available for obtaining pictures for transmission. These devices and techniques serve their intended purposes and function satisfactorily when utilized and operated under the given conditions for which they were designed. However, the known techniques and devices are not readily applicable to television systems and techniques which utilize rocket propelled missiles as camera vehicles. For example, the well known Nipkow disk scanning technique which utilizes a rotatable disk having a single row of apertures arranged along the edge portion of the disk at progressively reduced distances from center, so as to form a generally spiral configuration, may be utilized only for images of low definition. This limitation is intrinsic in the design of the device as the number of scan lines per frame is dictated by the number of apertures present in the row. The number of scan lines obtainable per frame is accordingly insufficient for high definition as it is not mechanically feasible to provide properly disposed apertures in a quantity necessary for providing images of high definition.

The use of conventional television tube-type cameras is limited by certain intrinsic disadvantages and difficulties when the cameras are mounted and used with rocket propelled space vehicle or systems. One such difficulty encountered is a lack of normally available camera tubes which possess the necessary ruggedness and the ability to function properly over a normally encountered wide temperature range. Another serious difficulty encountered, in designing and utilizing conventional tube-type camera systems for space television, is the inherent complexity, size and weight of such systems. This difficulty is necessarily compounded when color information is to be obtained and transmitted by the known systems.

Therefore, the purpose of this invention is to provide a simple, rugged, high definition television camera system for obtaining television pictures of the earth from space, embracing the advantages of the afore-mentioned known systems, while eliminating the hereinbefore described disadvantages. To attain this, the instant system utilizes a simple disk scanning technique for looking at the earth from the rear of a spinning vehicle, and serves to transmit a continuous series of television signals to ground receivers for display in standard radar type plan-position indicator (PPI) presentation.

It is an object of the present invention to provide a rugged, compact television scanning device which utilizes a line-scan technique for providing a ground display in standard radar type plan-positio nindicator (PPI) presentation.

Another object of the present invention is to provide a method and means for obtaining high defiinition pictures of the surface of the earth utilizing a disk having a limited number of uniformly spaced apertures therein.

A further object is to provide a method and means for obtaining pictures of the surface of the earth and providing a multi-colored ground display in standard radar PPI presentation.

Other objects, advantages and novel features of the invention will become apparent from the following detailed description of the invention when considered in conjunction with the accompanying drawings wherein.

Figure 1:
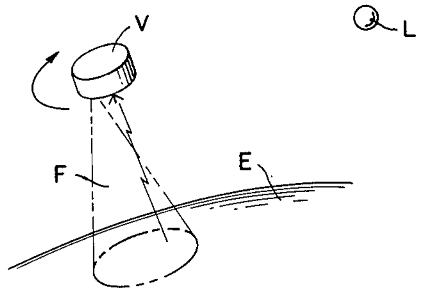
FIG. 1 is a schematic view illustrating the operative disposition of the scanning device of the present invention.

Referring now more specifically to the drawings, wherein like reference numerals designate like or corresponding parts throughout the several views, there is illustrated in FIG. 1 a spinning camera vehicle V displaced from the surface of the earth or celestial body E having a view F of the surface of body E illuminated by a solar light or sun L.

Figures 2, 3:
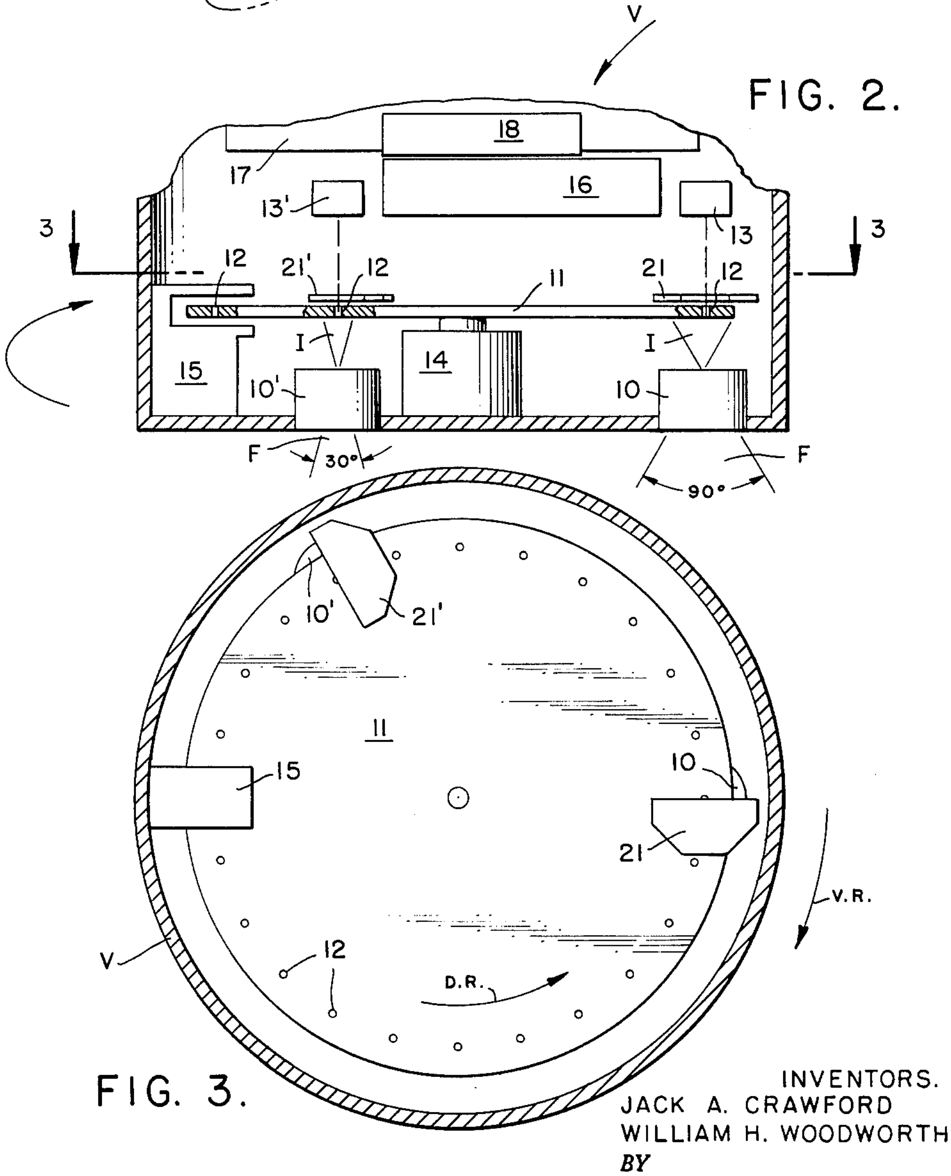
FIG. 2 is an enlarged fragmentary sectional view of the device.
FIG. 3 is a sectional plan view taken generally along lines 3—3 of FIG. 2.
Figures 5, 6, 7:
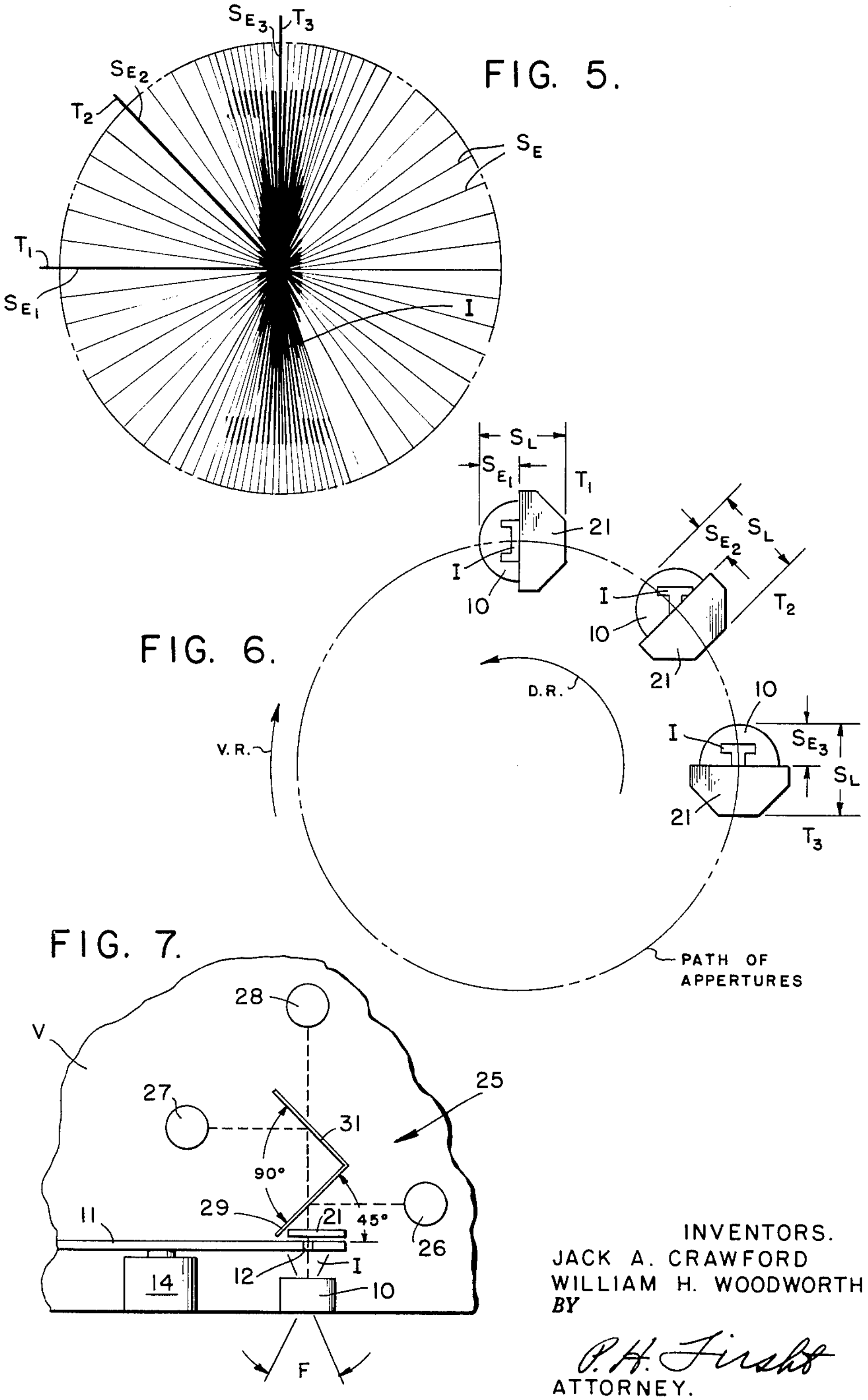
FIG. 5 is a diagrammatic view illustrating ground display presentation of the device.
FIG. 6 is a diagrammatic view depicting a sequential operation for the device.
FIG. 7 is a fragmentary schematic view illustrating a modification of the device shown in FIGS. 2 and 3.

Turning now to FIGS. 2 and 3, system components of the present invention are arranged within the vehicle V which is spinning through space at a given predetermined rate. The spinning of the vehicle is effected by any suitable means, not shown, for example, by known techniques. Disposed within the vehicle V, in spaced apart relationship, is a pair of optical, or lens, systems 10 and 10'. Each optical system functions to focus a light image I of an earth cloud cover, and/or earth's surface, at separate and spaced locations on a surface of a rotating disk 11 arranged adjacent the lens systems within the vehicle V. Disposed in single file around the edge portion of the disk 11 are a plurality of apertures 12 equally spaced from each other and arranged at equal distances from the center of the disk. The apertures 12 serve to pass or admit portions of the light image I, in a "chopping" fashion, as the image is focused on the rotating disk 11. The admitted portions of the image I form a series of moving beams of light which impinge as a series of sweeping spots on photo-multiplier tube systems 13 and 13' which are disposed adjacent a side of disk 11 opposite the lens system. The tubes 13 and 13' are of a well known design, for example RCA 6199 photo-multiplier tubes may be used in the instant system. The tubes are arranged so as to permit spot forming beams of light to sweep across their cathodes as the disk 11 rotates in a manner permitting the path of the apertures 12 to bisect the focused light image I, as illustrated in FIG. 6.

For rotating the disk 11, a motor 14 is mounted within the vehicle V and serves to rotate the disk 11 relative to the vehicle at a desired speed and in a given direction relative to the direction of the spin or rotation of the spinning vehicle V. The vehicle V rotates relative to the earth's surface in a given direction, for example, in a clockwise direction as indicated by directional arrows VR, FIG. 3, while the disk 11 is counter-rotating or rotating in a counter-clockwise direction, as indicated by directional arrows DR. The counter-rotation of the disk 11 and vehicle V reduces scan-line, and consequently sweep, curvature, which tends to be more prevalent when the disk and vehicle rotate in the same direction. However, the relative directions of rotation are not critical and may be varied as found desirable.

As shown in FIG. 2, a synchronizing generator 15, which may be of the photo-electric type, obtains sychronization information through the utilization of disk apertures 12 and supplies necessary synchronization signals to ground receivers. The camera and signal transmitting circuits arranged within vehicle V are disposed within units generally designated by reference numerals 16 and 17, FIG. 2. The relationship of system transmitting and receiving components is illustrated in block diagram in FIG. 4. As each of the components is of known design and construction, a detailed description thereof is not deemed necessary and has been omitted for the sake of brevity. However, the function of the circuit and the operative relationship of the various system components will hereinafter be more fully described in conjunction with a description of the operation of the instant invention. A nutation damper 18 is provided for stabilizing the vehicle V so that the images I, focused on the disk 11, remain relatively stabilized wtih regard to libratory motion. As a preselected image I is stabilized under the influence of damper 18, the scanning disk 11 is capable of providing a sufficient number of succeeding scan lines across the image I to accommodate image details with desired definition.

Each afore-mentioned optical, or lens, system, 10 and 10', serves to focus a field of view F, FIG. 2, with one lens being set for a 90 degree field of view and the other lens for a 30 degree field. It is to be understood that the illustration of FIG. 2 serves only as a schematic illustration of the disposition of the lens systems 10 and 10' within the vehicle V, and is not considered a scaled illustration of the established relationship between the optics of the two lens systems. The holes 12 of disk 11 generate scan lines $S_L$ FIG. 6, by admitting beams of light to impinge on and sweep across photo-multiplier tubes 13 and 13' in the aforementioned manner. The disk 11 thus serves as a "chopper" for traversing the preselected focused image I and "chops" it into a series of sweeping beams. The focused image I is caused to rotate relative to the vehicle V, and consequently the disk 11, as it impinges on the disk's surface through the afore-mentioned rotation of the vehicle V as it spins with respect to the surface of the earth E in the afore-mentioned manner. It is to be noted that only one set of the lens and tube systems is activated by suitable control means, not shown, at any given time in order that only one set image signals will be transmitted to ground receivers at any given time.

It is to be further noted that while the optical axes of the optical systems 10 and 10' are displaced from the vertical axis of rotation of the vehicle, no appreciable error is introduced through resulting parallax as the displacement of the optical axes does not introduce significant error.

Displacement of the scanner system from the earth's surface dictates the area or surface covered by the scanner's fields of view F. For example, when the camera is displaced to an altitude of 800 miles, the 90 degree field of view for one of the lens system will provide a ground or surface coverage of an area having a diameter of 1,600 miles, while a 30 degree field for the other lens system will provide a coverage of an area having a diameter of approximately 400 miles. The focal length of the lens, to provide a 90 degree field, must be 1.2 inches, and for a 30 degree field, 4.5 inches. The resolution for the 90 degree field of view is $19.6\times10^{-6}$ steradian, and for 30 degrees, $1.39\times10^{-6}$ steradian, thus defining the size of a linear object, which can be resolved at an altitude of 800 miles, as four miles at 90 degrees, and one mile at 30 degrees.

The luminous flux incident upon the system detector 13 and 13' is defined by $$F=\frac{E_s}{\pi}\Delta W A_L$$

where $F$=the flux in lumens; $E_s$=luminance of the object in lumens per square foot; $\Delta W$=steradian resolution; and $A_L$=effective area of the lens in square feet. The luminance of the object is determined by solar illumination, the angle of the sun L to the normal, and the albedo of the object. The best value of a solar illumination constant is about 12,700 lumens per square foot. This means that with the sun directly overhead and an albedo of 1.00, a worst case condition, a luminance of 12,700 lumens per square foot may be expected. Another extreme is with the sun at an angle of about 60 degrees off the normal and an albedo of .20. This minimum value of luminance is near 1,270 lumens per square foot. As the steradian resolution of the 90 degree field is 14 times the resolution of the 30 degree field, it is desirable to have the effective area of the 90 degree lens 1/14 of that of the 30 degree lens, or a factor of 3.74 difference in their diameters. Since the $f$-stop of the lens is the focal length of the lens divided by the effective diameter thereof, and the focal lengths also vary by a factor of 3.74, both lens systems should have the same $f$-stop number. A reasonable value of $f$-stop for readily available lens is approximately 3.0. This provides an effective area of the lens of approximately $8.72\times10^{-4}$ square feet for the 90 degree field and $12.27\times10^{-3}$ square feet for the 30 degree field. With these values, $F=5.44\times10^{-9}E_s$ lumens for both lens systems.

Using the maximum and minimum values $E_s$ of 12,700 and 1,270 lumens per square foot, the luminous flux at the system detector will be between 6.9 and 69 micro lumens. The sensitivity of a photo-multiplier tube, such as the afore-mentioned RCA 6199 photo-multiplier tube, can be adjusted to one micro-lumen with supply voltages between 500 and 700 volts. Higher voltages, up to 1,200 volts, will render greater sensitivity.

Scan rate of the instant system is relatively slow, as the information being obtained through the system is not particularly concerned with image motion and, therefore, information does not have to be obtained at a rapid rate. A scan rate of two frames per second has been found sufficient for obtaining pictures of the earth's surface. As a complete rotation or spin of the vehicle about its axis of rotation constitutes a single frame, and while the rate of vehicle rotation may be varied, a rate of rotation for the vehicle V about its axis of only two revolutions per second provides an adequate rate for the purposes of the present invention. A division of each frame into 500 lines provides reasonable definition in most instances. When the vehicle rotates at two revolutions per second, 500 lines per frame requires a linear sweep trigger signal rate of 1,000 pulses per second. Video information is contained in one millisecond pulses and then equated to a .030 inch spot size on a six inch linear sweep, requiring a frequency response of about 100 c.p.s. to 200 kc., when a 12 inch diameter display radar tube is used.

It is mechanically feasible to provide a disk 11 having a circular rings of apertures 12, 24 in number, to provide a circle having a 12 inch diameter. Therefore, the number 24 may be arbitrarily taken as a factor for determining rotational speed for the disk 11. As the photomultiplier tube, of the hereinabove referred to type, has a diameter of approximately 1.2 inches, the ring of apertures 12 has a diameter of 12 inches, for thus causing the apertures 12 to be spaced 15 degrees apart, or about 1.5 inches, some blanking time is allowed, and if a given trigger rate is one kc. 24 holes will define the disk's rotational velocity to be 2500 r.p.m.

For displaying signals generated by the hereinbefore described camera system, a radar display unit of a type known, such as a VJ–B radar display unit having a 12 inch tube, may be provided. The video signal received from the camera system must be within a positive volt range of 1.0 to 2.5 volts and have a bandwidth of 60 c.p.s. to six mc., and a 75 ohm output impedance. The linear sweep trigger signal may be allowed to vary from a positive 5 to 50 volts with a pulse-width of from .25$\mu$ second to 20$\mu$ seconds and a repetition rate between 57 and 1,000 pulses per second. A radial sweep signal is generated from a 115 volt A.C., 60 c.p.s. synchro generator having a rate which can be varied as desired. The spot size is approximately .030 inch in diameter and defines the maximum resolution required in a six inch linear sweep on the given radar tube. In order to attain a .030 inch spot on the radar tube it has been determined that the apertures 12 in disk 11 must be .006 inch diameter for admitting light beams to the photo-multiplier tube having a diameter of 1.2 inches, as above described.

In order to obtain a PPI presentation of a series of six inch linear sweeps $S_E$ generated outwardly from the center of a 12 inch tube at the display unit, as illustrated in FIG. 5, it is understood that each rotation or spin of the vehicle V generates a single circular frame as the vehicle rotates about its axis of rotation. Since the image I is caused to rotate on the surface of the disk 11, FIG. 6, due to the relative rotation between the body E and the vehicle V, the paths of holes 12 generate a series of sequentially occurring scan-line $S_L$ at progressively increased angles with respect to the image I, as each hole 12 of the disk 11 progresses in sequence across the image in a "chopping" fashion for thereby admitting a beam of light to impinge and sweep across an adjacent photo-multiplier tube. The scan-lines thus generated will result in a display array of sweeps $S_E$ dictated by mutually bisecting scan-lines $S_L$. Since the bisecting scan-lines are unintelligible in display, due to a superimposition of the bisected portions of the scan lines $S_L$, it is necessary that a blanking means be provided. Such means may comprise known electronic circuits, not shown, or mechanical means 21 and 21', FIGS. 3 and 6, secured to the vehicle V in a scan-line blanking arrangement relative to tubes 13 and 13' for blanking each ordinarily first occurring portion of each of the generated scan-line $S_L$. The mechanical means prevents the admitted beam from sweeping across the first half of the photo-multiplier tube, so that an effective sweep $S_E$, as illustrated in FIGS. 5 and 6, comprises that portion of a scan-line $S_L$ generated from the center of the image I outwardly when an aperture 12, and consequently an admitted beam of light, moves relative to the photo-multiplier tube as the disk 11 "chops" a selected image I. The afore-mentioned electronic blanking means may be of conventional design and may be included in the transmitting circuit to achieve a result similar to that achieved by mechanical means 21 and 21'.

Figure 8:
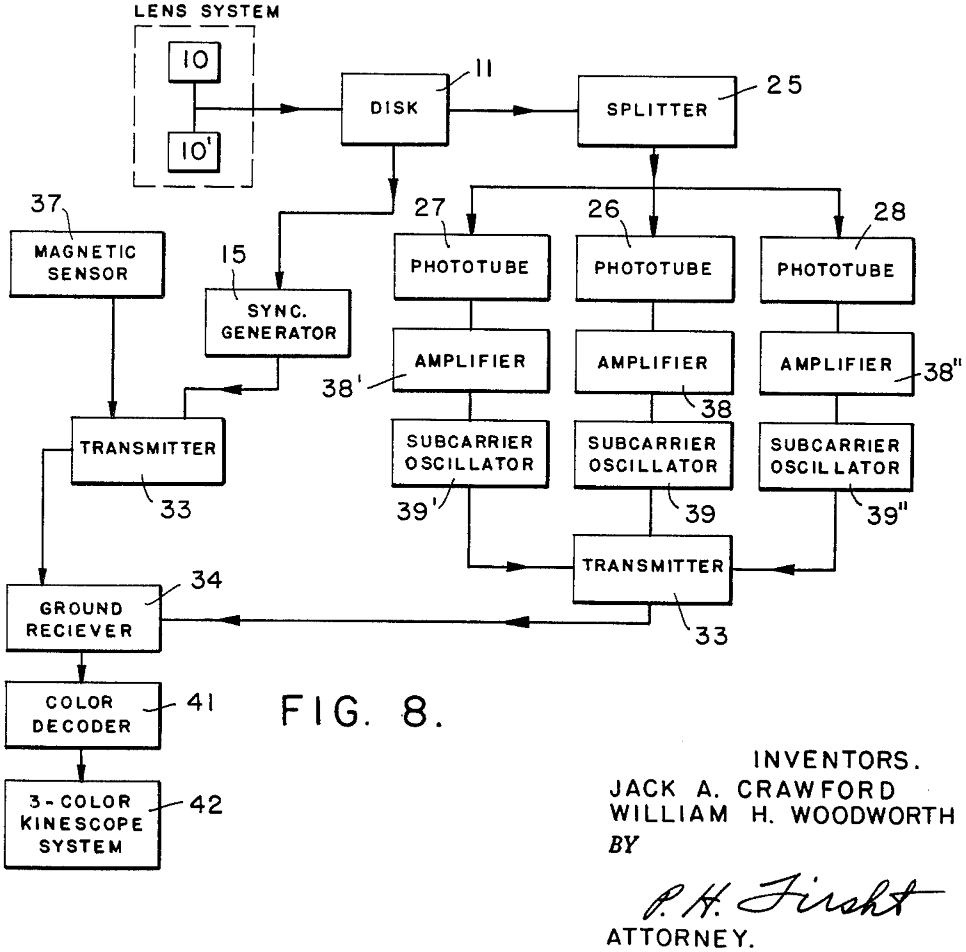
FIG. 8 is a diagrammatic view illustrating, in block form, circuitry provided for the modification shown in FIG. 7.

Attention is now particularly directed to FIGS. 7 and 8 wherein is shown a modification of the hereinabove described system. The modification comprises a high definition three-color scanner system for obtaining and providing chrominance information. The modification is readily applicable to the basic system and technique, hereinabove set forth, which serves to provide black and white information. The modified scanner system includes a scanning disk and lens system of a design similar to that previously described and, therefore, a specific description thereof is not deemed necessary and is omitted for the sake of brevity. However, it is understood that for transmitting color information it is necessary to provide for a beam splitting operation, viz. a spectral breaking down of light beams admitted by the apertures 12 before the beams impinge on the photo-multiplier tube system. One beam splitting means which may be utilized comprises a dichroic mirror beam splitting system 25. A separate system 25 is provided for each lens system 10 and 10' and is arranged as illustrated in FIG. 7. In order for the chrominance intelligence obtained by a system 25 to be transmitted a plurality of photo-multiplier tubes 26, 27 and 28 are arranged adjacent the beam splitting system. Each photo-multiplier tube is provided with a separate amplifier and subcarrier oscillator connected with a transmitter 33, as shown in FIG. 8. The plurality of photo-multiplier tubes 26, 27 and 28 are of conventional design, and may be of the type hereinbefore referred to. The tubes are disposed about a pair of dichroic mirrors 29 and 31 so that each photo-multiplier tube will have directed thereto only a certain spectral portion of the light beam admitted by the apertures 12 of the disk 11 in a manner illustrated by dotted lines in FIG. 7. Within the system 25, the mirror 29 is mounted at 45 degrees with respect to the plane of the disk 11 and serves to reflect blue light to impinge on photo-multiplier tube 26, while simultaneously passing red and green spectrum components. The mirror 31 is mounted at 90 degrees with respect to the plane of mirror 29 and serves to reflect the red light passed by mirror 29 to the photo-multiplier tube 27, and passes the green light which then impinges on the photo-multiplier tube 28. Each scan line is thus broken down into three colors and the intelligence is fed into the transmitting circuit, transmitted, received and displayed at the receiver in the three colors with the aforedescribed PPI presentation through a receiver circuit comprising well known components. The relationship of the components of the modified system is shown in block diagram in FIG. 8. The block diagram of FIG. 8 will be hereinafter more fully described in conjunction with a description of the operation of the device. However, it is understood that the given receiver may include any one of several known and commercially available three color display circuits, a specific detailed description of which is here deemed unnecessary.

Figure 4:
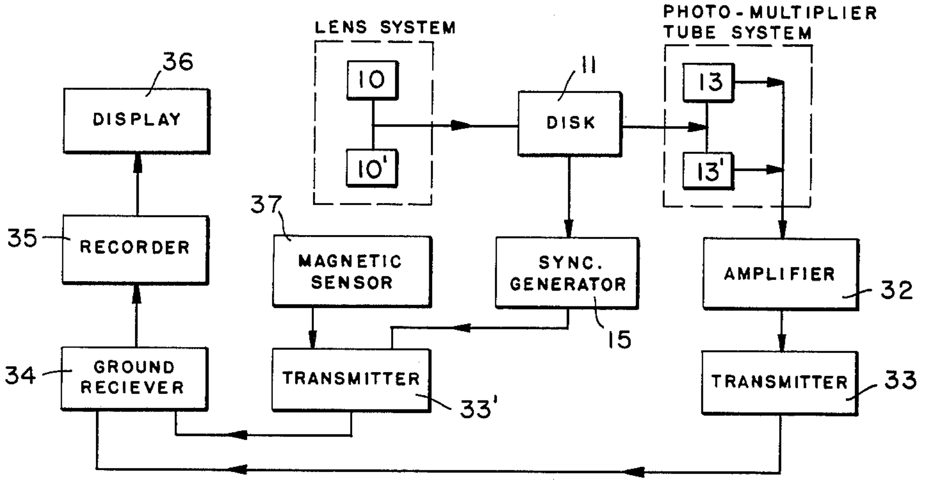
FIG. 4 is a schematic view, in block form, illustrating the circuitry of the present invention.

The operation of the basic scanning and display system may be more clearly described and understood with reference being made particularly to FIGS. 4, 5 and 6. As previously described, the separate lens systems 10 and 10' serve to focus images I at separate locations on the surface of a rotating disk 11. The disk 11 is provided with a plurality of apertures 12 serving to "chop" or admit portions of the focused image I in the form of light beams impinging as spots and, as the disk 11 rotates, sweeping across a pre-selected photo-multiplier tube 13 or 13', to thus generate a series of mutually bisecting scan-lines. Each scan-line has its first occurring portion removed by a blanking means, as illustrated in FIG. 6, in order to provide one half of a scan line for transmission purposes. As depicted in FIGS. 5 and 6, a scan-line $S_L$ generated at time $T_1$ dictates a sweep $S_E$ and each subsequently occuring scan-line $S_L$ generated at times $T_2$ and $T_3$, for example, likewise provide sweeps $S_{E_2}$ and $S_{E_3}$. Signals from a selected and activated tube are then amplified, through the use of conventional video signal amplifying means 32, fed to a transmitter 33, where it is transmitted to a ground receiver 34, relayed to a recorder 35 and displayed at 36 in a standard PPI presentation.

For obtaining necessary synchronization for the linear sweep of the display, the photo-electric synchronizing generator 15 is utilized to feed synchronizing signals through a transmitter component 33' to the ground receiver 34. The transmitter component 33' also serves as means for transmitting, to the ground receiver 34, signals from a magnetic sensor 37 for providing bearing information for rotating the linear sweep of the display in a radial motion as the camera vehicle V spins about its axis of rotation.

For purposes of summarizing the operation, it is assumed that the desired field of view F is a 90 degree field, with an image I focused by lens system 10, FIG. 2, and the photo-multiplier tube 13 is selectively activated for providing scan-line signals. The camera vehicle V is also assumed to be displaced from the earth's surface to an altitude of 800 miles and is rotating or spinning with the camera system "looking" from the aft portion of the vehicle V in a direction parallel to the vehicle's axis of rotation. As the vehicle spins the image I, of the field of view F, is focused by the lens system 10 on the surface of the rotating disk 11 so as to be traversed by apertures 12 of disk 11. The image I is caused to rotate with respect to the camera system, due to the relative rotation between the earth E and the vehicle V. Hence, the image I rotates on the surface of the disk 11. The apertures 12 of the disk traverse the image I at progressively increased angles and in rapid succession as both the image I and the disk 11 rotates relative to the vehicle V. As the apertures 12 traverse the image I in sequence, beams of light are admitted in succession and impinge as spots on the photo-multiplier tube 13 and sweep outwardly across one half of the tube as disk 11 "chops" image I, to thus generate a succession of scan-lines. The disk 11 is rotated at a speed sufficient to generate 500 bisecting scan-lines for each frame. It is to be particularly noted that, in effect, the first half of each bisected scan-line $S_L$ is blanked by the mechanical means 21, to thus provide signals for effective sweeps $S_E$ radiating outwardly from the center of the display as the signals are received and displayed in the manner illustrated in FIG. 5. The signals are transmitted, along with the attendant synchronizing and magnetic aspect sensor signals, to the ground receivers 36 and displayed in standard PPI presentation, as hereinbefore described.

When found desirable to transmit color information, utilizing the scanner or camera system of the present invention, the light beams admitted by the apertures 12 are first broken into three spectral components of blue, red and green by the dichoic mirror system 25. The components are focused on separate photo-multiplier tubes 26, 27 and 28 for generating sweep signals, which signals are fed through separate amplifier systems 38, 38' and 38'' and subcarrier oscillator 39, 39' and 39'', and then to the transmitter 33 for transmission to the ground receiver 34 where the signals are reduced utilizing a color decoder 41 and kinescope system 42 capable of providing color reproduction in a three color display with a standard PPI presentation at 36. The kinescope system used for reproducing in color may comprise a three-color kinescope, a black and white kinescope with a rotating three-color disk, or a three-color tube filter and image combining system.

Obviously many modifications and variations of the present invention are possible in the light of the above teachings. It is therefore to be understood that within the scope of the appended claims the invention may be practiced otherwise than as specifically described.

What is claimed is:

1. A method of televising the earth's surface, comprising:

providing a television mechanical-scanning and transmitting system having a lens system, and a rotatable scanner disk provided with a plurality of equally spaced light admitting apertures arranged in a circular pattern about the edge portion of the disk and spaced at equal distances from the center thereof;

displacing the system from the surface of the earth into celestial space;

rotating said disk;

focusing light reflected from the surface of the earth for forming an image of a view of the earth on said disk through said lens system, whereby portions of the image in the form of beams of light are passed in sequence through said disk to impinge on a light responsive means to thus provide a series of image reproducing scan-line generated sweep signals;

rotating the system relative to the earth, while continuing to focus the image forming light on the disk so that the relative rotation between the system and the earth presents a rotating image on the surface of the disk, which image is sequentially traversed in a chopping fashion by said apertures for thereby progressively generating a series of bisecting scan-lines intersecting at the center of the image; and blanking each first occurring one-half portion of each bisected scan-line whereby display is effected through a progression of scan-line generated sweeps radiating from a common center of the image.

2. The method as defined in claim 1, further comprising the step of breaking down the light admitted by said apertures into spectral divisions to provide color intelligence for transmission to provide a multi-color ground display.

3. A television technique comprising the steps of:

providing a system having a photo-multiplier system and scanning disk provided with a plurality of apertures equally spaced from each other along the circumference of the disk and at equal radial distance from the center thereof;

focusing an image to be scanned on said disk;

effecting rotation of said image relative to said system;

simultaneously rotating said disk in image traversing fashion so as to pass the apertures between the photo-multiplier tube and the focused image to thus generate a series of scan lines generated at progressively increasing angles relative to said rotating image as the apertures pass between said tube and said image; and blanking a first half portion of each scan-line so that a second half portion of said signals may be utilized for displaying a second half portion of each scan-line thus generated.

4. In the method as defined in claim 3, the additional step of breaking down the image into three separate color components to provide a series of signals indicative of image color.

5. A device for obtaining a picture of the earth's surface utilizing a line-scan technique for a ground display in the standard radar type PPI presentation, comprising:

a vehicle rotatable with respect to the surface of the the earth; a vehicle-mounted rotatable disk having a pair of opposite faces and a plurality of aligned apertures extending between the opposite faces of the disk along the periphery thereof;

means for rotating the disk at an accelerated rate with respect to the vehicle;

a photo-multiplier tube system fixedly mounted on said vehicle adjacent a first face of the disk;

a lens system fixedly mounted on said vehicle adjacent the opposite face of said disk and adapted to focus light reflected from the earth's surface for forming an image on the disk in a manner such that each aperture is caused to diametrically traverse the image as the disk is rotated, whereby a portion of the reflected light is passed through each aperture of said rotatable disk to thus form a light beam impinging on said tube system for generating a scan-line as each aperature is caused to traverse the image; and a blanking means for blanking a first one-half portion of each generated scan line so that a second one-half portion of the generated scan lines may be transmitted to effect a ground display in said standard PPI presentation as the payload is rotated with respect to the surface of the earth.

6. The device as defined in claim 5, wherein the photo-multiplier tube system includes a plurality of photo-multiplier tubes having means for separating each light beam into a plurality of separate spectral divisions and for causing the separate spectral divisions to impinge on separate photo-multiplier tubes for producing a multi-colored ground display.

7. The device according to claim 6, further characterized in that the vehicle includes means for stabilizing the device against nutation.

8. In a television system for obtaining pictures to be displayed in standard radar-type PPI presentation, means comprising:

a photo-responsive signal producing means;

an image focusing system;

a rotatable apertured scanner disk arranged between said signal producing means and said focusing means so that an image may be focused on said disk;

means for rotating said apertured disk relative to said signal producing means; and a rotating vehicle supporting said system for effecting rotation of the focused image relative to the signal producing means to thus generate a series of signals for transmission as apertures of the disk are caused to bisect the image for causing a spot of light to impinge and sweep across the signal producing means.

References Cited by the Examiner

UNITED STATES PATENTS

| | | | |
|---|---|---|---|
| 1,748,883 | 2/1930 | Kell | 178—5.4 |
| 1,874,191 | 8/1932 | Ives | 178—5.4 |
| 2,099,889 | 11/1937 | Ives | 178—5.4 |
| 2,163,749 | 6/1939 | De Forest | 178—7.6 |
| 3,033,924 | 5/1962 | Ainsworth | 178—6.8 |
| 3,069,493 | 12/1962 | Martel | 178—6 |

OTHER REFERENCES

"Tiros I-Meteorological Satellite," Astronautics: June, 1960, pages 32–34 and 84–86.

DAVID G. REDINBAUGH, *Primary Examiner.*

ROBERT SEGAL, *Examiner.*